United States Patent [19]

Fitzpatrick

[11] Patent Number: 4,595,211
[45] Date of Patent: Jun. 17, 1986

[54] SNOWMOBILE SKI UNDERLAYER

[76] Inventor: James W. Fitzpatrick, Box 132, Star Rte., Bonner, Mont. 59823

[21] Appl. No.: 594,738
[22] Filed: Mar. 29, 1984
[51] Int. Cl.⁴ ............................................. B62B 17/00
[52] U.S. Cl. .................................... 280/28; 280/12 A
[58] Field of Search ............... 280/12 A, 28, 825, 604; 180/190

[56] References Cited

U.S. PATENT DOCUMENTS

| 3,482,849 | 12/1969 | Puetz | 280/28 |
| 3,719,369 | 3/1973 | Savage | 280/28 |
| 3,738,676 | 6/1973 | Hand | 280/28 |

FOREIGN PATENT DOCUMENTS

| 155490 | 9/1932 | Switzerland | 280/604 |
| 223797 | 4/1943 | Switzerland | 280/604 |

Primary Examiner—John J. Love
Assistant Examiner—Joseph G. McCarthy
Attorney, Agent, or Firm—Harvey B. Jacobson

[57] ABSTRACT

An elongated thin flexible strip of plastic material is provided for removable securement beneath the ski of a snowmobile. The under surface of the strip is smoothly finished and has substantially no tendency to be subject to a build up of frozen snow thereon under certain temperature and snow conditions which cause snow to freeze to and build up on a metal snowmobile ski under surface. The strip includes longitudinally spaced opposite side tab portions by which elongated tension structure may be utilized to removably secure the strip to the underside of a snowmobile ski and further includes structure for embracingly engaging the usual elongated and longitudinally extending wear and steering bar which projects downwardly from the under surface of a snowmobile ski. Further, the strip is sufficiently flexible for the forward end thereof to project beyond the tip end of the associated snowmobile ski and to be bent back thereover. The forward end of the strip includes a longitudinal slot therein through which the usual arcuate brace member for the associated snowmobile ski tip is receivable and the forward terminal end of the strip includes anchor structure by which one end of a tension member may be anchored thereto, the other end of the tension member being anchorable to the ski tip rearward of the portion thereof received through the slot.

10 Claims, 6 Drawing Figures

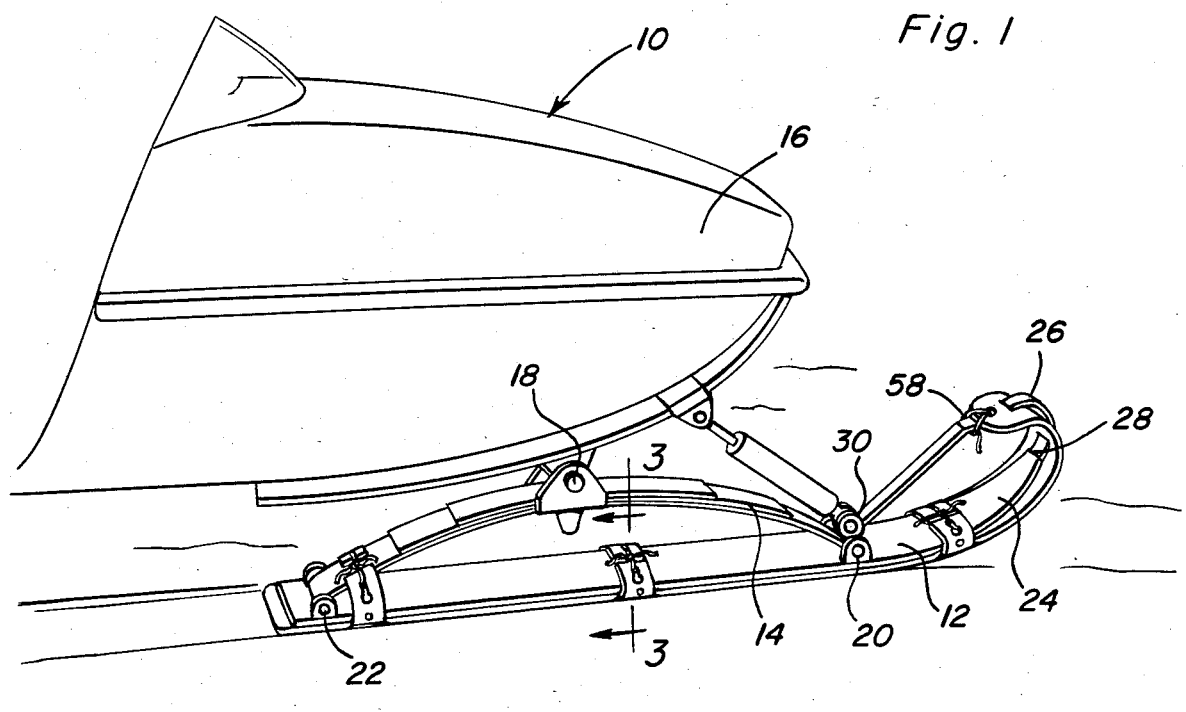
Fig. 1
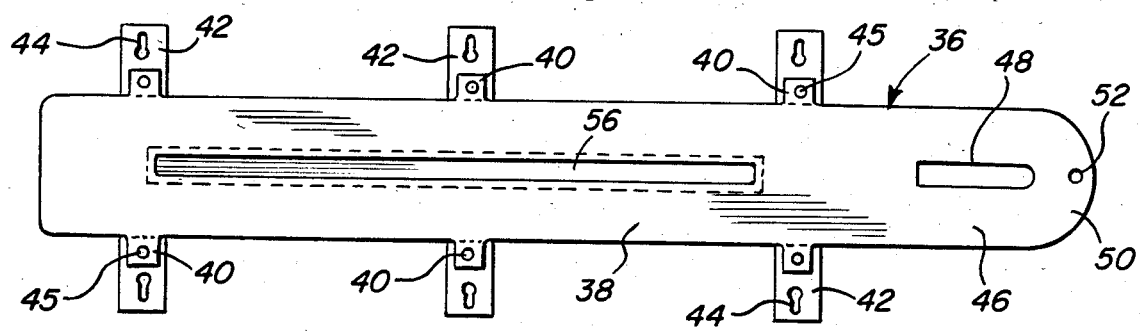
Fig. 2
Fig. 4
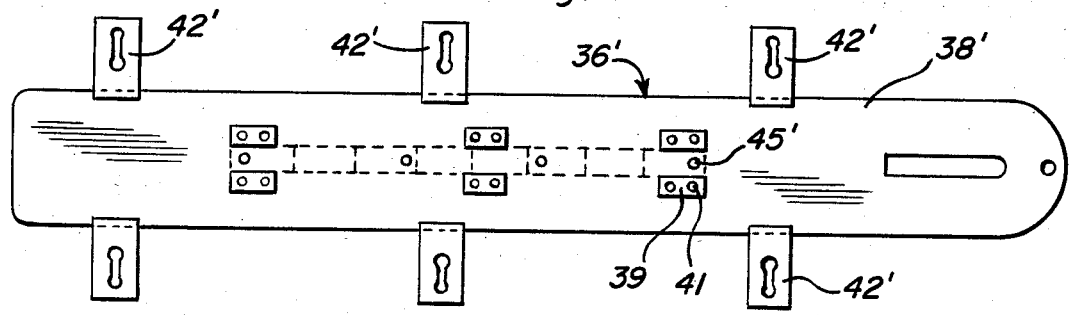
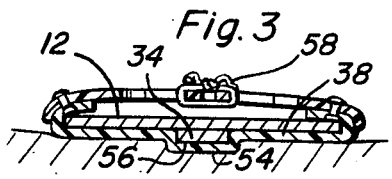
Fig. 3
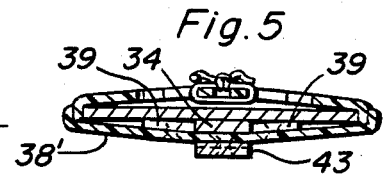
Fig. 5
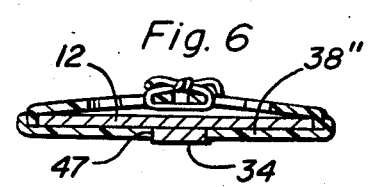
Fig. 6

SNOWMOBILE SKI UNDERLAYER

BACKGROUND OF THE INVENTION

Under certain temperature and snow conditions, the under surface portions of snowmobile skis are subject to a build up of frozen snow and ice thereon. When this build up of frozen snow and ice accumulates, forward progress of the snowmobile is seriously impeded, especially in deep powder snow, as a result of the increased resistance of the skis of the snowmobile to slide over a snow covered surface. In some instances, the tendency of snow and ice to build up on the underside of snowmobile skis is so great that forward progress of the snowmobile is substantially prevented. Accordingly, a need exists for structure by which the underside of a snowmobile ski may be maintained free of accumulated snow and/or ice thereon.

BRIEF DESCRIPTION OF THE INVENTION

The underlayer of the instant invention comprises a thin flexible panel of smooth plastic to be attached to an associated snow mobile ski with the strip of plastic underlying the under surface of the snowmobile ski. The plastic is of a type which will not support the build up of frozen snow and ice thereon and which therefore maintains the under surface thereof free of snow and ice build up.

Although the plastic strip is subject to more rapid wear than the metal ski of the associated snowmobile, the strip is used only when those temperatures and snow conditions are encountered which promote the build up of frozen snow and ice on the underside of conventional snowmobile skis.

The plastic strip is of a length slightly longer than a snowmobile ski and may be of a width which is slightly greater than the width of a snow mobile ski. However, the strip is quite flexible and may be easily rolled into a compact state for storage until use thereof is required.

The main object of this invention is to provide an underlayer for a snowmobile ski which may be attached to the ski and utilized to prevent the build up of frozen snow and ice on the surface of the ski which slides over the snow being traversed by an associated snowmobile.

Another object of this invention is to provide an underlayer for a snowmobile ski which may be rolled into a compact state for ready storage.

Still another important object of this invention is to provide an underlayer for a snowmobile ski which may be readily operatively attached to the ski whenever its usage is desired.

A still further object of this invention is to provide a snowmobile ski underlayer which may be readily attached to the skis of snowmobiles of different manufacture.

A final object of this invention to be specifically enumerated herein is to provide a snowmobile ski underlayer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the forward right-hand portion of a conventional form of snowmobile with the ski underlayer of the instant invention operatively associated with the forward right ski of the snowmobile, the forward left ski not being shown;

FIG. 2 is a top plan view of the snowmobile ski underlayer;

FIG. 3 is an enlarged transverse vertical sectional view taken substantially upon the plane indicated by the section line 3—3 of FIG. 1;

FIG. 4 is a top plan view of a second form of snowmobile ski underlayer;

FIG. 5 is a sectional view similar to FIG. 3 and illustrating the second form of ski underlayer illustrated in FIG. 4 as applied to a snowmobile ski; and FIG. 6 is a sectional view similar to FIGS. 3 and 5 illustrating the mounting of a third form of snowmobile ski underlayer on the snowmobile ski.

DETAILED DESCRIPTION OF THE INVENTION

Referring now more specifically to the drawings, the numeral 10 generally designates a conventional form of snowmobile including a forward ski 12. The ski 12 is mounted from a longitudinally extending upwardly arched spring 14 pivotally anchored to the body 16 of the snowmobile 10 as at 18 and the opposite ends of the spring 14 are pivotally anchored to the ski 12 as at 20 and 22.

The ski 12 includes a forward end 24 which curves upwardly and is forwardly tapered to define a ski tip and the ski tip is braced relative to the remainder of the ski 12 by an arcuate brace member 26 having one end thereof secured to the ski tip as at 28 and the other end thereof mounted relative to the ski 12 as at 30. Further, the central portion of the underside of the ski 12 includes an elongated longitudinally extending wear and steering bar 34. The bar 34 may actually comprise an integral formed and downwardly offset portion of the ski 12 or, as illustrated, a separate bar of generally rectangular cross section which is secured to the underside of the ski 12.

The underlayer of the instant invention is referred to in general by the reference numeral 36 and comprises an elongated flexible strip 38 of plastic material having a smooth under surface. The strip 38 is of a width slightly greater than the width of the ski 12 and includes longitudinally spaced opposite side laterally outwardly projecting tab portions 40 to which anchor tabs 42 provided with keyhole slots 44 are attached by rivets 45.

The strip 38 also includes a forward end portion 46 havng a longitudinal central slot 48 formed therein and a forward terminal end 50 having an aperture 52 formed therethrough. Also, the central longitudinal portion of the strip 38 includes an integral formed portion 54 defining a longitudinally extending upwardly opening recess 56.

In operation, when the under surface of the ski 12 experiences a build up of frozen snow and/or ice, the snowmobile 10 is stopped, the snow and the ice build up is removed and the strip 38 is disposed beneath the ski 12 with the wear and steering bar 34 snugly received in the recess 56 and the tabs 42 bent upwardly and over corresponding opposite side portions of the ski 12 and secured together by suitable fastening means such as lengths of cord or string 58, see FIG. 3. In addition, the forward end 46 of the strip 38 is bent back over forward end 24 of the ski 12 and the arcuate brace member 26 is received through the slot 48, see FIG. 1. A further length of string or cord 58 is secured through the aperture 52 and about the midportion of the brace member 26. In this manner, the strip 38 is securely fastened to the ski 12 with the strip 38 completely covering the under surfaces of the ski 12. The plastic of which the strip 38 is constructed is of a type upon which frozen snow and/or ice may not accumulate. Accordingly, when the ski 12 has the strip 38 secured thereto, the snowmobile 10 will not experience the build up of frozen snow and/or ice upon the ski under surface which contacts the snow over which the snowmobile 10 is moving.

The strip 38 is sufficiently thin to be quite flexible and thus may be readily rolled into a compact state for storage when not in use.

With attention now invited more specifically to FIG. 4 of the drawings, there may be seen a second form of underlayer 36' which is generally similar to the underlayer 36. The underlayer 36' differs from the underlayer 36 in that the tabs 42' thereof are attached directed to the longitudinal marginal portions of the strip 38' in any convenient manner such as by thermo or heat welding and the upper surface of the strip 38' includes longitudinally spaced pairs of transversely spaced abutment blocks 39 secured thereto in any convenient manner such as by rivets 41. The abutment blocks 39 are spaced apart to snugly receive the wear and steering bar 34 therebetween, see FIG. 5. Also, it will be noted that the central longitudinal area of the underside of the strip 38' includes an elongated steering and wear bar 43 secured thereto in any convenient manner such as by rivets 45'. The central area of the strip 38' underlies the ski wear and steering bar 34 and the wear and steering bar 43 carried by the underside of the strip 38' directly underlies that portion of the strip 38' in registry with the ski wear and steering bar 34. Otherwise, the strip 38' is structurally and operationally similar to the strip 38.

With attention now invited more specifically to FIG. 6, there will be seen a third form of strip 38". The strip 38" is constructed in a manner similar to the strip 38', but does not include the abutment blocks 39 and wear bar 43 of the strip 38'. Instead, the strip 38" includes a central longitudinal slot 47 through which the wear and steering bar 34 of the associated ski 12 projects. The vertical thickness of the wear and steering bar 34 is considerably greater than the vertical thickness of the strip 38" and the bar 34 therefore protrudes downwardly below the under surface of the strip 38".

Each of the strips 38, 38' and 38" is wholly operative to prevent the build up of frozen snow and/or ice on the under surface thereof and thus may be applied to the underside of the ski 12 whenever the temperature and snow conditions tend to promote the build up of frozen snow and/or ice on the underside of the ski 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a snowmobile ski including an under surface subject to a build up of frozen snow and/or ice thereon under certain temperature and snow conditions and to the extent which seriously impedes the forward movement of the associated snowmobile due to increased resistance to movement of the ski over a snow cover, a ski underlayer comprising a flexible strip of smooth plastic material, said strip being removably mounted upon said ski beneath the latter and covering, from beneath, at least substantially all of the under surface portions of said ski, said ski including an elongated, arcuate, downwardly opening and longitudinally extending tip brace, one end portion of said strip projecting outwardly beyond the forward tip end of said ski, said one end portion being reversely bent back over said tip end and including opposite side portions thereof passing rearwardly along and beyond corresponding sides of the forward portion of said tip brace, and anchor means releasably anchoring the opposite side portions of said reversely bent one end portion of said strip to said ski rearwardly of said tip brace forward portion.

2. The ski and underlayer combination of claim 1 wherein longitudinally spaced opposite side marginal portions of said strip include laterally outwardly projecting anchor tabs, and elongated flexible tension member means extending between corresponding opposite side anchor tabs and passing transversely over said ski.

3. In combination with a snowmobile ski including an under surface subject to a build up of frozen snow and/or ice thereon under certain temperature and snow conditions and to the extent which seriously impedes forward movement of the associated snowmobile due to increased resistance to movement of the ski over a snow cover, a ski underlayer comprising a flexible strip of smooth plastic material, said strip being removably mounted upon said ski beneath the latter and covering, from beneath, at least substantially all of the under surface portions of said ski, said ski including an elongated, arcuate, downwardly opening and longitudinally extending tip brace, one end portion of said strip projecting outwardly beyond the forward tip end of said ski, said one end portion being reversely bent back over said tip and including an elongated longitudinal slot formed therein upwardly through which an intermediate length portion of said tip brace projects, the terminal end of said one end portion of said strip including anchor means anchorable to a portion of the brace rearward of said slot.

4. In combination with a snowmobile ski including an under surface subject to a build up of frozen snow and/or ice thereon under certain temperature and snow conditions and to the extent which seriously impedes forward movement of the associated snowmobile due to increased resistance to movement of the ski over a snow cover, a ski underlayer comprising a flexible strip of smooth plastic material, said strip being removably mounted upon said ski beneath the latter and covering, from beneath, at least substantially all of the under surface portions of said ski, said ski under surface including a central elongated and longitudinally extending wear and steering bar projecting downwardly from said under surface, said strip including a downwardly indented central longitudinal portion thereof defining an upwardly opening recess in which said wear bar is snugly received.

5. In combination with a snowmobile ski including an under surface subject to a build up of frozen snow and- /or ice thereon under certain temperature and snow conditions and to the extent which seriously impedes forward movement of the associated snowmobile due to increased resistance to movement of the ski over a snow cover, a ski underlayer comprising a flexible strip of smooth plastic material, said strip being removably mounted upon said ski beneath the latter and covering, from beneath, at least substantially all of the under surface portions of said ski, said ski under surface including a central, elongated and longitudinally extending wear and steering bar projecting downwardly from said under surface, said strip includes longitudinally extending opposite side abutment members supported from the upper surface thereof and spaced apart laterally of said strip between which said bar is snugly received.

6. The ski and underlayer combination of claim 5 wherein said abutment members include pairs of opposite side abutment members spaced longitudinally of said strip.

7. The ski and underlayer combination of claim 6 wherein the underside of said underlayer includes a longitudinally extending downwardly projecting wear and steering strip secured thereto and supported from a central portion of said strip disposed between said abutment members.

8. In combination with a snowmobile ski including an under surface subject to a build up of frozen snow and/or ice thereon under certain temperature and snow conditions and to the extent which seriously impedes forward movement of the associated snowmobile due to increased resistance to movement of the ski over a snow cover, a ski underlayer comprising a flexible strip of smooth plastic material, said strip being removably mounted upon said ski beneath the latter and covering, from beneath, at least substantially all of the under surface portions of said ski, said ski under surface including a central, elongated and longitudinally extending wear and steering bar projecting downwardly from said under surface, said strip including a central longitudinal slot through which said wear and steering bar is snugly received, the vertical thickness of said strip being less than the vertical thickness of said bar.

9. The ski and underlayer combination of claim 8 wherein longitudinally spaced opposite side marginal portions of said strips include laterally outwardly projecting anchor tabs, and elongated flexible tension member means extending between corresponding opposite side anchor tabs and passing transversely over said ski.

10. The ski and underlayer combination of claim 8 wherein said ski includes an elongated arcuate downwardly opening and longitudinally extending tip brace, one end portion of said strip projecting outwardly beyond the forward tip end of said ski, said one end portion being reversely bent back over said tip and including an elongated longitudinal slot formed therein upwardly through which an intermediate length portion of said tip brace projects, the terminal end of said one end portion of said strip including anchor means anchorable to a portion of brace rearward of said slot.

* * * * *